(12) United States Patent
Jagannathan et al.

(10) Patent No.: US 11,868,942 B2
(45) Date of Patent: Jan. 9, 2024

(54) METHODS AND SYSTEMS FOR FACILITATING RANKING AGENTS MAKING SALES OF REAL ESTATE

(71) Applicants: Sunder Jagannathan, Coimbatore (IN); Vivek Agarwal, Faridabad (IN); Hitesh Singla, Gurgaon (IN)

(72) Inventors: Sunder Jagannathan, Coimbatore (IN); Vivek Agarwal, Faridabad (IN); Hitesh Singla, Gurgaon (IN)

(73) Assignee: SY Interiors Pvt. Ltd., New Delhi (IN)

( * ) Notice: Subject to any disclaimer, the term of this patent is extended or adjusted under 35 U.S.C. 154(b) by 136 days.

(21) Appl. No.: 17/511,503

(22) Filed: Oct. 26, 2021

(65) Prior Publication Data
US 2023/0127409 A1 Apr. 27, 2023

(51) Int. Cl.
G06Q 10/00 (2023.01)
G06Q 10/0639 (2023.01)
H04L 12/18 (2006.01)
G06Q 10/0631 (2023.01)

(52) U.S. Cl.
CPC ........... *G06Q 10/06398* (2013.01); *G06Q 10/063114* (2013.01); *H04L 12/1831* (2013.01)

(58) Field of Classification Search
CPC ............ G06Q 10/063; G06Q 10/0639; G06Q 10/06398; G06Q 10/063114
See application file for complete search history.

(56) References Cited

U.S. PATENT DOCUMENTS

| | | | |
|---|---|---|---|
| 2007/0255611 A1* | 11/2007 | Mezo ................... | G06Q 30/02 235/381 |
| 2011/0145159 A1 | 6/2011 | Wilson et al. | |
| 2016/0352900 A1* | 12/2016 | Bell ..................... | H04M 3/5175 |
| 2019/0156444 A1* | 5/2019 | Targownik ........... | G06Q 50/163 |
| 2022/0036277 A1* | 2/2022 | Ranganathan ........ | G10L 25/63 |
| 2022/0239777 A1* | 7/2022 | Tennur Narayanan ...................... H04M 3/5233 |

FOREIGN PATENT DOCUMENTS

| | | |
|---|---|---|
| WO | 2017070126 A1 | 4/2017 |
| WO | 2017210633 A1 | 12/2017 |
| WO | 2019055439 A1 | 3/2019 |
| WO | 2019087063 A1 | 5/2019 |

OTHER PUBLICATIONS

Packard, G., & Berger, J. (2021). How concrete language shapes customer satisfaction. Journal of Consumer Research, 47(5), 787-806. (Year: 2021).*

* cited by examiner

*Primary Examiner* — William S Brockington, III
(74) *Attorney, Agent, or Firm* — Dhiraj Jindal; PATENT YOGI LLC

(57) ABSTRACT

Disclosed herein is a method of ranking agents making sales of real estate. Accordingly, the method may include receiving, using a communication device, a sale pitch delivered by an agent for making a sale of a real estate to a client on a platform in a sale session from a first device, receiving, using the communication device, a response provided by the client corresponding to the sale pitch delivered on the platform in the sale session from a second device, analyzing, using a processing device, at least one of the sale pitch and the response in the sale session using a machine learning model, generating, using the processing device, an agent score for the agent based on the analyzing, and storing, using a storage device, the agent score and at least one of the sale pitch and the response of the sale session.

16 Claims, 16 Drawing Sheets

| Aa Parameter | ≡ Points | ≡ Maximum Points |
|---|---|---|
| Profile picture | 30 | 30 |
| Number of Employees | 10 | 10 |
| Rera Number | 20 | 20 |
| Languages Spoken | 5 X Languages | 20 |
| Years of Experience | 2 X Experience | 20 |

COUNT 6

FIG. 9

| Aa Parameter Name | ≡ Points |
|---|---|
| Project Name | 15 |
| Furnishing | 10 |
| View Facing | 10 |
| Available Form | 10 |
| Parking | 5 |
| Bathroom | 5 |
| Unit No | 5 |
| Ameneties | 10 |
| Age of Property | 5 |
| Tower/Block No | 5 |
| Description | 20 |

COUNT 11

FIG. 11

METHODS AND SYSTEMS FOR FACILITATING RANKING AGENTS MAKING SALES OF REAL ESTATE

FIELD OF THE INVENTION

Generally, the present disclosure relates to the field of data processing. More specifically, the present disclosure relates to methods and systems for facilitating ranking agents making sales of real estate.

BACKGROUND OF THE INVENTION

The field of data processing is technologically important to several industries, business organizations, and/or individuals.

Generally, in the sales and marketing industry, reading and responding to client's words, body language, and facial expressions is crucial and helps to sell more products and close business deals. Existing techniques for facilitating ranking agents making sales of real estate are deficient with regard to several aspects. For instance, current technologies do not facilitate monitor facial expressions, body language, and speech (or words) of the client for ranking of the agents. Furthermore, current technologies do not facilitate the ranking of the agents using the machine learning model. Moreover, current technologies do not facilitate ranking the agents based on the agent's response (such as facial expression, body language, and speech) to the client.

Therefore, there is a need for improved methods and systems for facilitating ranking agents making sales of real estate that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a method of ranking agents making sales of real estate, in accordance with some embodiments. Accordingly, the method may include receiving, using a communication device, at least one sale pitch delivered by an agent for making a sale of a real estate to a client on a platform in at least one sale session from at least one first device. Further, the method may include receiving, using the communication device, at least one response provided by the client corresponding to the at least one sale pitch delivered on the platform in the at least one sale session from at least one second device. Further, the method may include analyzing, using a processing device, at least one of the at least one sale pitch and the at least one response in the at least one sale session using at least one machine learning model. Further, the method may include generating, using the processing device, an agent score for the agent based on the analyzing. Further, the agents may be ranked based on the agent score. Further, the method may include storing, using a storage device, the agent score and at least one of the at least one sale pitch and the at least one response of the at least one sale session.

Further disclosed herein is a system of ranking agents making sales of real estate, in accordance with some embodiments. Accordingly, the system may include a communication device configured for receiving at least one sale pitch delivered by an agent for making a sale of a real estate to a client on a platform in at least one sale session from at least one first device. Further, the communication device may be configured for receiving at least one response provided by the client corresponding to the at least one sale pitch delivered on the platform in the at least one sale session from at least one second device. Further, the system may include a processing device communicatively coupled with the communication device. Further, the processing device may be configured for analyzing at least one of the at least one sale pitch and the at least one response in the at least one sale session using at least one machine learning model. Further, the processing device may be configured for generating an agent score for the agent based on the analyzing. Further, the agents may be ranked based on the agent score. Further, the system may include a storage device communicatively coupled with the processing device. Further, the storage device may be configured for storing the agent score and at least one of the at least one sale pitch and the at least one response of the at least one sale session.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

FIG. 9 is a tabular representation illustrating factors considered for a profile score, in accordance with some embodiments.

FIG. 11 is a tabular representation illustrating listing completeness score, in accordance with some embodiments.

DETAIL DESCRIPTIONS OF THE INVENTION

Figure 1:
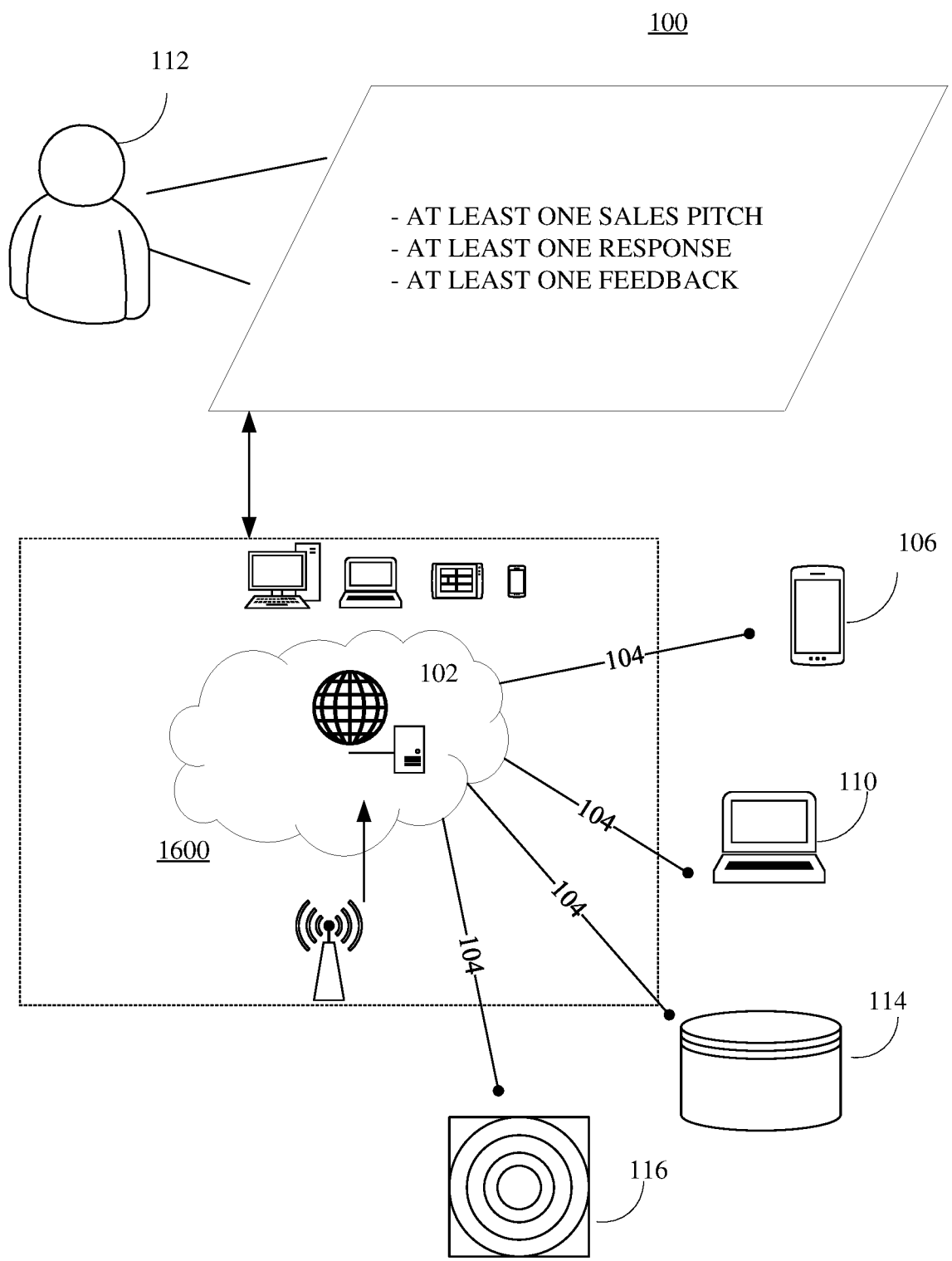
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods and systems for facilitating ranking agents making sales of real estate, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer etc.) and/or possession of a machine readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device etc.) corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview:

The present disclosure describes methods and systems for facilitating ranking agents making sales of real estate. Further, the disclosed system may be configured for scoring and ranking different parameters filled by brokers against their profile & property listings. Further, the disclosed system may be configured for awarding points on actionable parameters and using the points to serve users ensuring they not only get the required listing/agent but also of the utmost quality.

Further, the disclosed system may be configured for generating scores associated with agents and property listings based on scoring parameters. Further, agent scoring associated with the agents may be based on profile along with qualifications, service quality (such as call Discussion and recorded quality and site visit quality), transactions, and platform activities. Further, the disclosed system may include a sales-based video and voice calling platform that is tracking both the salesperson and the customers. Further, the disclosed system may record every sales call, and it is then processed by the server which also has the data of the transaction and closures. Based on the success and failure of closures, the analytics on the cloud takes place to improve the efficiency of the overall sales. Further, call recording is converted from speech to text. Further, the disclosed system may be configured for text scanning through AI to find persuasive words and inflection points from voice processing. Further, the disclosed system may be configured for mapping the timing of words and facial expressions, pupil, and customer reactions. Further, the disclosed system may be configured for tracking parameters such as facial expressions, pupil reactions, speech, inflection points in the speech, chat information, duration of the calls, quality of the call, direct feedback received from a form of the customer post-call. Further, the disclosed system may be configured for performing post-call data analytics that may be associated with customer follow-ups, closure—yes or no, revenue from the closure, and time is taken for closure. Further, the disclosed system may be configured for real estate virtual showcasing. Further, the disclosed system may be configured for pixel tracking of mouse movements. Further, the disclosed system may be configured for tracking clicks in the experience. Further, the disclosed system may be configured for providing video, voice, and 3D experience in the center (Virtual showcasing platform). Further, the disclosed system may be configured for opening up brochures, floorplans, and time spent on each of these collaterals, and expressions recognition of the customer during the same. Further, questions asked by customers are analyzed and updated for agents to improve their pitches. Further, the disclosed system may be configured for converting customers to digital booking—getting to understand their feedback post-call on the sales agent and the property being showcased. Further, the path of the virtual showcasing may include the travel path of virtual site visits from the entrance. Further, real estate virtual showcasing may be associated with time spent in each room or image experience.

Further, the disclosed system may be configured for performing post-call recording analysis. Further, the disclosed system may be configured for creating reports for both sales agents and managers to get recommendations based on post-call recording analysis. Further, a transcript of the call gets recorded, highlighting the keywords, and frequency. Further, the post-call recording analysis may be associated with a model to analyze. Further, the timing of the call from multiple calls done by agents is analyzed to predict the best time to call during the day, the average time to be spoken, and most effective keywords and transcripts, pitch and voice tone to be used, how sales agent is dressed on a video call. Further, the disclosed system may be configured for generating reports suggesting recommendations for sales agents and managers. Further, the report may include a post-call report stating the above parameters. Further, the report may include the improvement and efficiency score of the sales agent.

Further, a listing may include listing completeness score, image uniqueness, image quantity+distribution, price relevance, and boosting parameters (Preferred and verified).

For agent scoring, the disclosed system may consider a mix of parameters that stay constant with a profile along with dynamic factors that change based on the agent's activity with clients and dealing with our platform. Further, the disclosed system may be configured for scoring each factor on 100, For static ones, it will be direct. For the dynamic ones, the disclosed system may award 100 points to the highest scorer and normalize the rest of the city users based on that score.

For Service quality, the disclosed system may be configured for taking the average rating of the user which will be an average of reviews received by the user along with ratings received on activities (Site visit, call, and meeting with a client). All the qualified agents for this parameter should have a minimum of 10 unique ratings. Further, score=Average Rating×20.

Further, the disclosed system may be configured for taking the transaction on count, value, and recency. Further, the highest transactions will be awarded 100 and the rest of that city users will be normalized about that only.

Total Points=Sum of all the transaction points.
Rental Transaction=2 Points
Resale Transaction=10 Points Further, for platform activities, the disclosed system may be configured for taking the active listing count and lead activity percentage of the broker as an active broker should perform on both parameters to stay relevant. Further, listing count and activity carry a 40 and 60% weightage respectively.

For Listings, the disclosed system may be calculated based on active listing count along with recency factors, which are as follows, 2× Listing Count for listings posted in the last 7 days, 10% weekly reduction after that. Further, the highest score on that city may be awarded 40 and the rest of the users will be normalized on it.

Further, activity percentage may be the percentage of activity done on leads within 13 working hours. Further, for this one, the disclosed system may multiply the average by 12.

Further, for listing scoring, the disclosed system may be configured for putting up a mix of dynamic parameters and some constants that come up in a listing.

Further, the listing completeness score may be rated out of 100 and may have a score against the filled parameters of that listing. Further, image uniqueness may be rated out of 100 and may carry the unique image percentage as a uniqueness score.

Further, price relevance signifies how relevant or realistic is the price of that particular listing, most brokers try to list at a lower price to attract customers. So, if the price of a listing lies in the average bracket then we'll straightaway award 100 else 20% reduction based on the deviation. Apart from these, the disclosed system may be associated with boosting parameters for listing that may include verified listing, featured listing, and listing by a preferred partner.

FIG. 1 is an illustration of an online platform 100 consistent with various embodiments of the present disclosure. By way of non-limiting example, the online platform 100 for facilitating ranking agents making sales of real estate may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, etc.), databases 114, and sensors 116 over a communication network 104, such as, but not limited to, the Internet. Further, users of the online platform 100 may include relevant parties such as, but not limited to, end-users, administrators, service providers, service consumers, and so on. Accordingly, in some instances, electronic devices operated by the one or more relevant parties may be in communication with the platform.

A user 112, such as the one or more relevant parties, may access online platform 100 through a web based software application or browser. The web based software application may be embodied as, for example, but not be limited to, a website, a web application, a desktop application, and a mobile application compatible with a computing device 1600.

Figure 2:
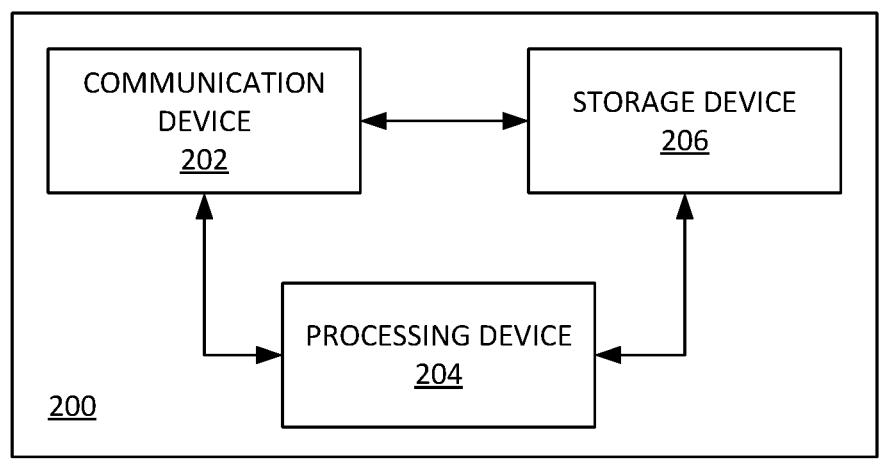
FIG. 2 is a block diagram of a system of ranking agents making sales of real estate, in accordance with some embodiments.

FIG. 2 is a block diagram of a system 200 of ranking agents making sales of real estate, in accordance with some embodiments. Accordingly, the system 200 may include a communication device 202 configured for receiving at least one sale pitch delivered by an agent for making a sale of a real estate to a client on a platform in at least one sale session from at least one first device. Further, the at least one first device may include at least one first capturing device configured for capturing the at least one sale pitch delivered by the agent. Further, the at least one sale session may be established between the agent and the client on the platform. Further, the communication device 202 may be configured for receiving at least one response provided by the client corresponding to the at least one sale pitch delivered on the platform in the at least one sale session from at least one second device. Further, the at least one second device may include at least one second capturing device configured for capturing the at least one response of the client.

Further, the system 200 may include a processing device 204 communicatively coupled with the communication device 202. Further, the processing device 204 may be configured for analyzing at least one of the at least one sale pitch and the at least one response in the at least one sale session using at least one machine learning model. Further, the processing device 204 may be configured for generating an agent score for the agent based on the analyzing. Further, the agents may be ranked based on the agent score.

Further, the system 200 may include a storage device 206 communicatively coupled with the processing device 204. Further, the storage device 206 may be configured for storing the agent score and at least one of the at least one sale pitch and the at least one response of the at least one sale session. Further, in some embodiments, the storage device 206 may be configured for retrieving transaction data associated with at least one transaction performed by the client for the real estate. Further, the processing device 204 may be configured for analyzing the transaction data. Further, the generating of the agent score may be based on the analyzing of the transaction data.

Further, in some embodiments, the processing device 204 may be configured for authenticating the client based on the analyzing of the at least one response of the client. Further, the processing device 204 may be configured for performing at least one transaction process for the sale of the real estate using at least one of client data associated with the client, real estate data associated with the real estate, and the agent data associated with the agent based on the authenticating. Further, the performing of the at least one transaction process may include initiating the at least one transaction process. Further, the at least one transaction process may include approving, booking, transferring, etc. of the real estate. Further, the storage device may be configured for retrieving at least one of the client data associated with the client, the real estate data associated with the real estate, and the agent data associated with the agent based on the authenticating. Further, in an embodiment, the processing device 204 may be configured for generating the transaction data based on the performing of the at least one transaction process. Further, the storage device 206 may be configured for storing the transaction data.

Further, in some embodiments, the processing device 204 may be configured for authenticating the client using at least one authenticating method based on the analyzing of the at least one response of the client. Further, the generating of the agent score may be based on the authenticating. Further, the at least one authenticating method may include e-signature authentication, facial authentication, voice authentication, etc.

Further, in some embodiments, the platform may include a virtual showcasing platform. Further, the virtual showcasing platform may be configured for showcasing a virtual representation of the real estate. Further, the at least one sale pitch may include at least one agent interaction of the agent with the visual representation of the real estate showcased on the virtual showcasing platform. Further, the analyzing of the at least one sale pitch may include performing an interaction analysis of the at least one agent interaction. Further, the generating of the agent score may be based on the performing of the interaction analysis.

Further, in some embodiments, the communication device 202 may be configured for receiving at least one feedback provided by the client after the at least one sale session from the at least one second device. Further, the processing device

204 may be configured for analyzing the at least one feedback. Further, the generating of the agent score may be based on the analyzing of the at least one feedback.

Further, in some embodiments, the processing device 204 may be configured for generating at least one session characteristic based on the at least one sale session. Further, the processing device 204 may be configured for analyzing the at least one session characteristic based on the generating of the at least one session characteristic. Further, the generating of the agent score may be based on the analyzing of the at least one session characteristic.

Further, in some embodiments, the at least one first capturing device may include at least one of a first audio capturing device, a first video capturing device, and a first motion capturing device. Further, the at least one sale pitch may include at least one of an agent voice, an agent video, and an agent movement of the agent. Further, the analyzing of the at least one sale pitch may include performing at least one of a voice analysis, a video analysis, and a motion analysis of at least one of the agent voice, the agent video, and agent movement. Further, the generating of the agent score may be based on the performing of at least one of at the voice analysis, the video analysis, and the motion analysis of at least one of the agent voice, the agent video, and the agent movement.

Further, in an embodiment, the processing device 204 may be configured for determining a persuasiveness of the at least one sale pitch based on the performing of at least one of the voice analysis, the video analysis, and the motion analysis of at least one of the agent voice, the agent video, and the agent movement. Further, the generating of the agent score may be based on the determining of the persuasiveness.

Further, in some embodiments, the processing device 204 may be configured for determining at least one tracking parameter in at least one of the agent voice, the agent video, and the agent movement based on the performing of at least one of the voice analysis, the video analysis, and the motion analysis of at least one of the agent voice, the agent video, and the agent movement. Further, the generating of the agent score may be based on the identifying of the at least one tracking parameter.

Further, in some embodiments, the processing device 204 may be configured for converting the agent voice into an agent speech using at least one natural language processing model based on the performing of at least one of the voice analysis, the video analysis, and the motion analysis of at least one of the agent voice, the agent video, and the agent movement. Further, the processing device 204 may be configured for analyzing the agent speech based on the converting. Further, the processing device 204 may be configured for identifying at least one persuasive word in the agent speech based on the analyzing of the agent speech. Further, the generating of the agent score may be based on the identifying of the at least one persuasive word.

Further, in some embodiments, the at least one second capturing device may include at least one of a second audio capturing device, a second video capturing device, and a second motion capturing device, wherein the at least one response may include at least one of a client voice, a client video, and a client movement of the client. Further, the analyzing of the at least one response may include performing at least one of a voice analysis, a video analysis, and a motion analysis of at least one of the client voice, the client video, and the client movement. Further, the generating of the agent score may be based on the performing of at least one of the voice analysis, the video analysis, and the motion analysis of at least one of the client voice, the client video, and the client movement.

Further, in some embodiments, the processing device 204 may be configured for converting the agent voice into an agent speech using at least one natural language processing model based on the performing of at least one of the voice analysis, the video analysis, and the motion analysis of at least one of the agent voice, the agent video, and the agent movement. Further, the processing device 204 may be configured for analyzing the agent speech based on the converting. Further, the processing device 204 may be configured for determining at least one agent word in the agent speech based on the analyzing of the agent speech. Further, the processing device 204 may be configured for determining at least one client expression of the client based on the performing of at least one of the voice analysis, the video analysis, and the motion analysis of at least one of the client voice, the client video, and the client movement. Further, the processing device 204 may be configured for matching the at least one client expression with the at least one agent word based on the determining of the at least one client expression and the determining of the at least one agent word. Further, the processing device 204 may be configured for determining a match between the at least one client expression and the at least one agent word based on the matching. Further, the generating of the agent score may be based on the determining of the match.

Figure 3:
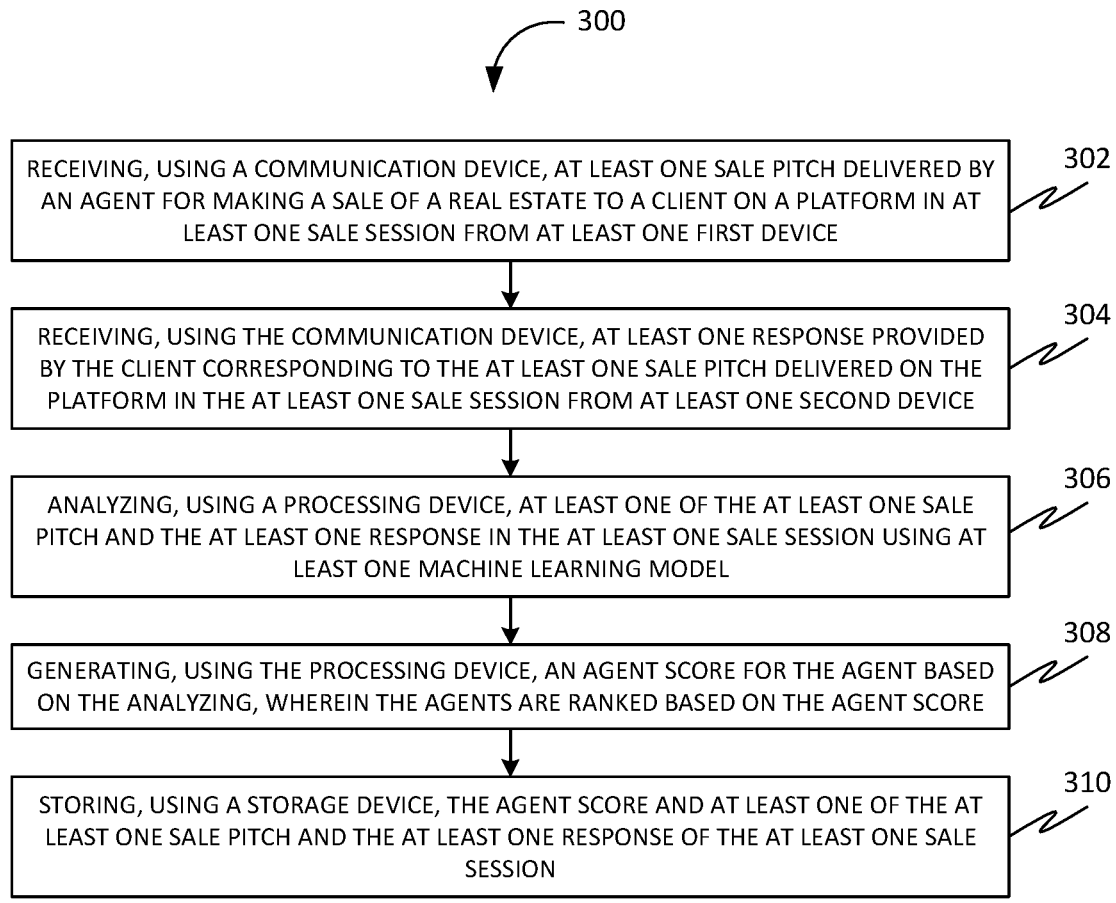
FIG. 3 is a flowchart of a method of ranking agents making sales of real estate, in accordance with some embodiments.

FIG. 3 is a flowchart of a method 300 of ranking agents making sales of real estate, in accordance with some embodiments. Accordingly, at 302, the method 300 may include receiving, using a communication device (such as the communication device 202), at least one sale pitch delivered by an agent for making a sale of a real estate to a client on a platform in at least one sale session from at least one first device. Further, the at least one first device may include at least one first capturing device configured for capturing the at least one sale pitch delivered by the agent. Further, the at least one sale session may be established between the agent and the client on the platform.

Further, at 304, the method 300 may include receiving, using the communication device, at least one response provided by the client corresponding to the at least one sale pitch delivered on the platform in the at least one sale session from at least one second device. Further, the at least one second device may include at least one second capturing device configured for capturing the at least one response of the client.

Further, at 306, the method 300 may include analyzing, using a processing device (such as the processing device 204), at least one of the at least one sale pitch and the at least one response in the at least one sale session using at least one machine learning model.

Further, at 308, the method 300 may include generating, using the processing device, an agent score for the agent based on the analyzing. Further, the agents may be ranked based on the agent score.

Further, at 310, the method 300 may include storing, using a storage device (such as the storage device 206), the agent score and at least one of the at least one sale pitch and the at least one response of the at least one sale session.

Further, in some embodiments, the platform may include a virtual showcasing platform. Further, the virtual showcasing platform may be configured for showcasing a virtual representation of the real estate. Further, the at least one sale pitch may include at least one agent interaction of the agent with the visual representation of the real estate showcased on the virtual showcasing platform. Further, the analyzing of the at least one sale pitch may include performing an interaction analysis of the at least one agent interaction. Further, the generating of the agent score may be based on the performing of the interaction analysis.

Further, in some embodiments, the at least one first capturing device may include at least one of a first audio capturing device, a first video capturing device, and a first motion capturing device. Further, the at least one sale pitch may include at least one of an agent voice, an agent video, and an agent movement of the agent. Further, the analyzing of the at least one sale pitch may include performing at least one of a voice analysis, a video analysis, and a motion analysis of at least one of the agent voice, the agent video, and the agent movement. Further, the generating of the agent score may be based on the performing of at least one of at the voice analysis, the video analysis, and the motion analysis of at least one of the agent voice, the agent video, and the agent movement.

Further, in an embodiment, the method 300 may include determining, using the processing device, a persuasiveness of the at least one sale pitch based on the performing of at least one of the voice analysis, the video analysis, and the motion analysis of at least one of the agent voice, the agent video, and the agent movement. Further, the generating of the agent score may be based on the determining of the persuasiveness.

Further, in some embodiments, the method 300 may include determining, using the processing device, at least one tracking parameter in at least one of the agent voice, the agent video, and the agent movement based on the performing of at least one of the voice analysis, the video analysis, and the motion analysis of at least one of the agent voice, the agent video, and the agent movement. Further, the generating of the agent score may be based on the determining of the at least one tracking parameter.

Figure 4:
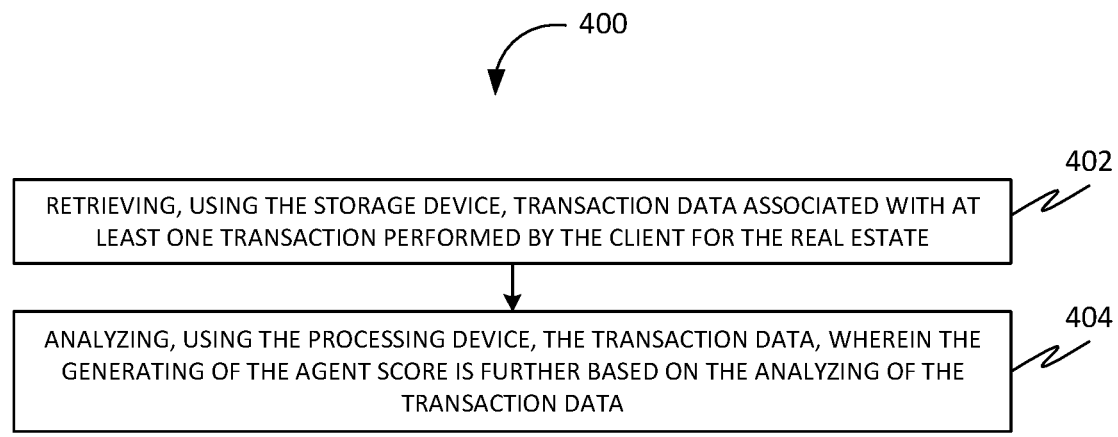
FIG. 4 is a flowchart of a method of retrieving transaction data for facilitating ranking agents making sales of real estate, in accordance with some embodiments.

FIG. 4 is a flowchart of a method 400 of retrieving transaction data for facilitating ranking agents making sales of real estate, in accordance with some embodiments. Accordingly, at 402, the method 400 may include retrieving, using the storage device, transaction data associated with at least one transaction performed by the client for the real estate. Further, at 404, the method 400 may include analyzing, using the processing device, the transaction data. Further, the generating of the agent score may be based on the analyzing of the transaction data.

Figure 5:
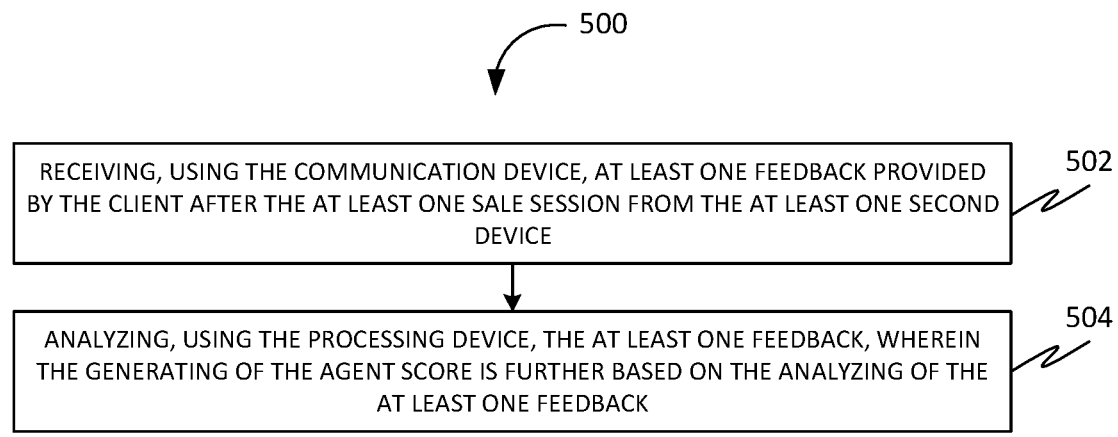
FIG. 5 is a flowchart of a method of receiving at least one feedback for facilitating ranking agents making sales of real estate, in accordance with some embodiments.

FIG. 5 is a flowchart of a method 500 of receiving at least one feedback for facilitating ranking agents making sales of real estate, in accordance with some embodiments. Accordingly, at 502, the method 500 may include receiving, using the communication device, at least one feedback provided by the client after the at least one sale session from the at least one second device. Further, at 504, the method 500 may include analyzing, using the processing device, the at least one feedback. Further, the generating of the agent score may be based on the analyzing of the at least one feedback.

Figure 6:
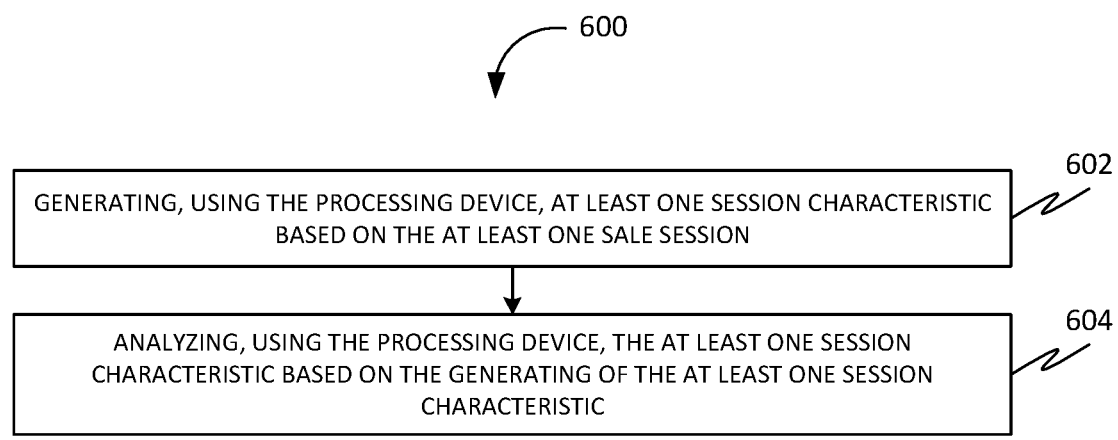
FIG. 6 is a flowchart of a method of generating at least one session characteristic for facilitating ranking agents making sales of real estate, in accordance with some embodiments.

FIG. 6 is a flowchart of a method 600 of generating at least one session characteristic for facilitating ranking agents making sales of real estate, in accordance with some embodiments. Accordingly, at 602, the method 600 may include generating, using the processing device, at least one session characteristic based on the at least one sale session.

Further, at 604, the method 600 may include analyzing, using the processing device, the at least one session characteristic based on the generating of the at least one session characteristic. Further, the generating of the agent score may be based on the analyzing of the at least one session characteristic.

Figure 7:
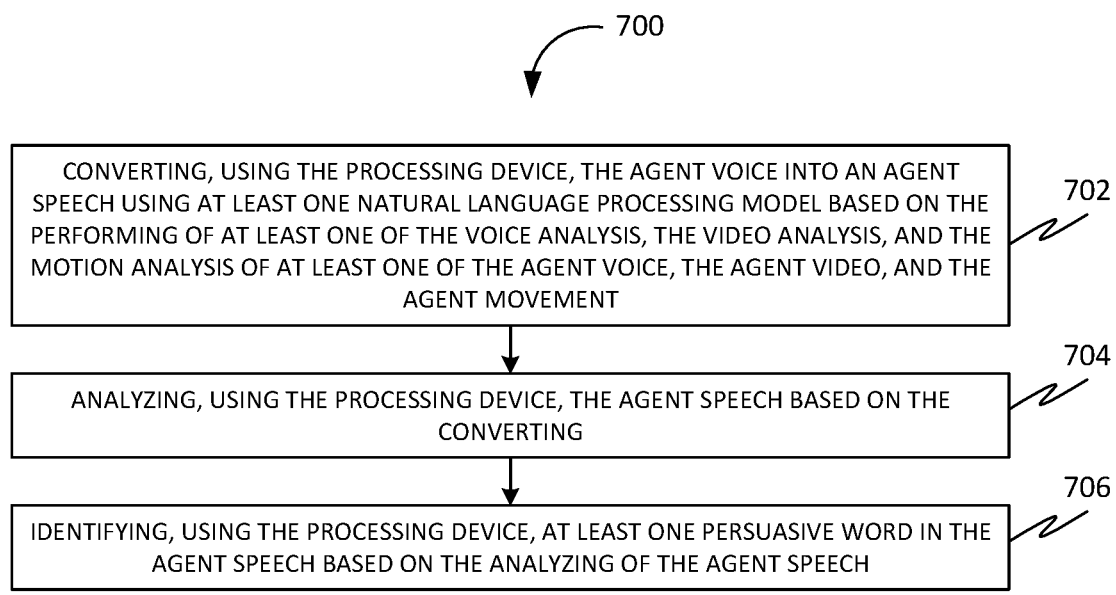
FIG. 7 is a flowchart of a method of retrieving transaction data for facilitating ranking agents making sales of real estate, in accordance with some embodiments.

FIG. 7 is a flowchart of a method 700 of retrieving transaction data for facilitating ranking agents making sales of real estate, in accordance with some embodiments. Accordingly, at 702, the method 700 may include converting, using the processing device, the agent voice into an agent speech using at least one natural language processing model based on the performing of at least one of the voice analysis, the video analysis, and the motion analysis of at least one of the agent voice, the agent video, and the agent movement.

Further, at 704, the method 700 may include analyzing, using the processing device, the agent speech based on the converting.

Further, at 706, the method 700 may include identifying, using the processing device, at least one persuasive word in the agent speech based on the analyzing of the agent speech. Further, the generating of the agent score may be based on the identifying of the at least one persuasive word.

Further, in some embodiments, the at least one second capturing device may include at least one of a second audio capturing device, a second video capturing device, and a second motion capturing device. Further, the at least one response may include at least one of a client voice, a client video, and a client movement of the client. Further, the analyzing of the at least one response may include performing at least one of a voice analysis, a video analysis, and a motion analysis of at least one of the client voice, the client video, and the client movement. Further, the generating of the agent score may be based on the performing of at least one of the voice analysis, the video analysis, and the motion analysis of at least one of the client voice, the client video, and the client movement.

Figure 8:
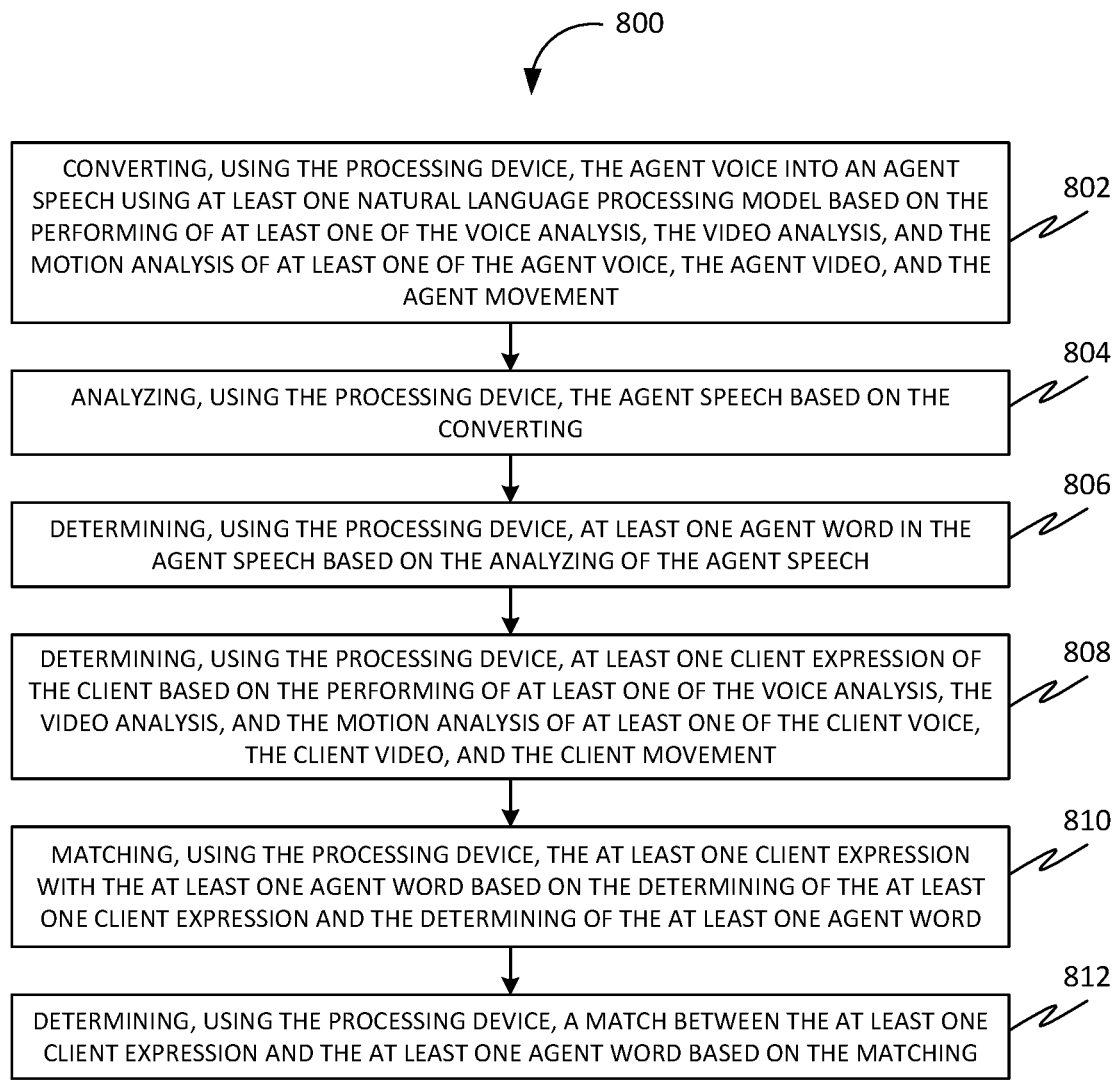
FIG. 8 is a flowchart of a method of determining a match between the at least one client expression and the at least one agent word for facilitating ranking agents making sales of real estate, in accordance with some embodiments.

FIG. 8 is a flowchart of a method 800 of determining a match between the at least one client expression and the at least one agent word for facilitating ranking agents making sales of real estate, in accordance with some embodiments. Accordingly, at 802, the method 800 may include converting, using the processing device, the agent voice into an agent speech using at least one natural language processing model based on the performing of at least one of the voice analysis, the video analysis, and the motion analysis of at least one of the agent voice, the agent video, and the agent movement.

Further, at 804, the method 800 may include analyzing, using the processing device, the agent speech based on the converting.

Further, at 806, the method 800 may include determining, using the processing device, at least one agent word in the agent speech based on the analyzing of the agent speech.

Further, at 808, the method 800 may include determining, using the processing device, at least one client expression of the client based on the performing of at least one of the voice analysis, the video analysis, and the motion analysis of at least one of the client voice, the client video, and the client movement.

Further, at 810, the method 800 may include matching, using the processing device, the at least one client expression with the at least one agent word based on the determining of the at least one client expression and the determining of the at least one agent word.

Further, at 812, the method 800 may include determining, using the processing device, a match between the at least one client expression and the at least one agent word based on the matching. Further, the generating of the agent score may be based on the determining of the match.

FIG. 9 is a tabular representation 900 illustrating factors considered for a profile score, in accordance with some embodiments.

Figure 10:
FIG. 10 is a tabular representation illustrating a degradation formula, in accordance with some embodiments.

FIG. 10 is a tabular representation 1000 illustrating a degradation formula, in accordance with some embodiments.

FIG. 11 is a tabular representation 1100 illustrating listing completeness score, in accordance with some embodiments.

Figure 12:
FIG. 12 is a tabular representation illustrating actors for image quantity and tag score, in accordance with some embodiments.

FIG. 12 is a tabular representation 1200 illustrating factors for image quantity and tag score, in accordance with some embodiments.

Figure 13:
FIG. 13 is a tabular representation illustrating factors for image quantity and tag score, in accordance with some embodiments.

FIG. 13 is a tabular representation 1300 illustrating factors for image quantity and tag score, in accordance with some embodiments.

Figure 14:
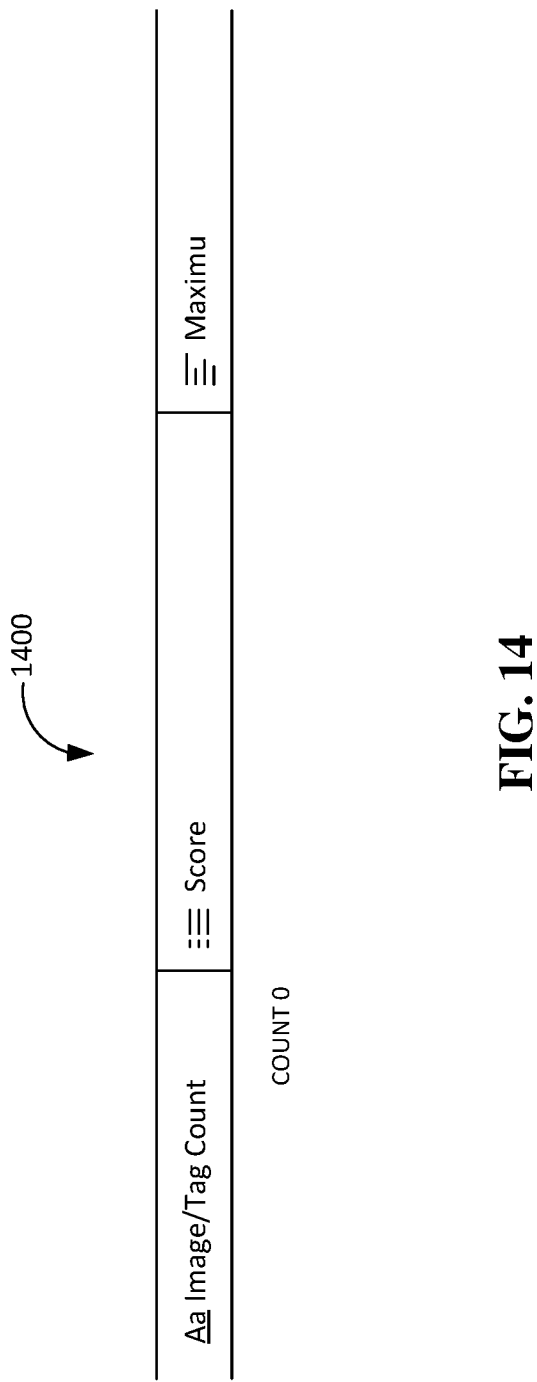
FIG. 14 is a tabular representation illustrating factors for image quantity and tag score, in accordance with some embodiments.

FIG. 14 is a tabular representation 1400 illustrating factors for image quantity and tag score, in accordance with some embodiments.

Figure 15:
FIG. 15 is a tabular representation illustrating factors for boosting listing score, in accordance with some embodiments.

FIG. 15 is a tabular representation 1500 illustrating factors for boosting listing score, in accordance with some embodiments.

Figure 16:
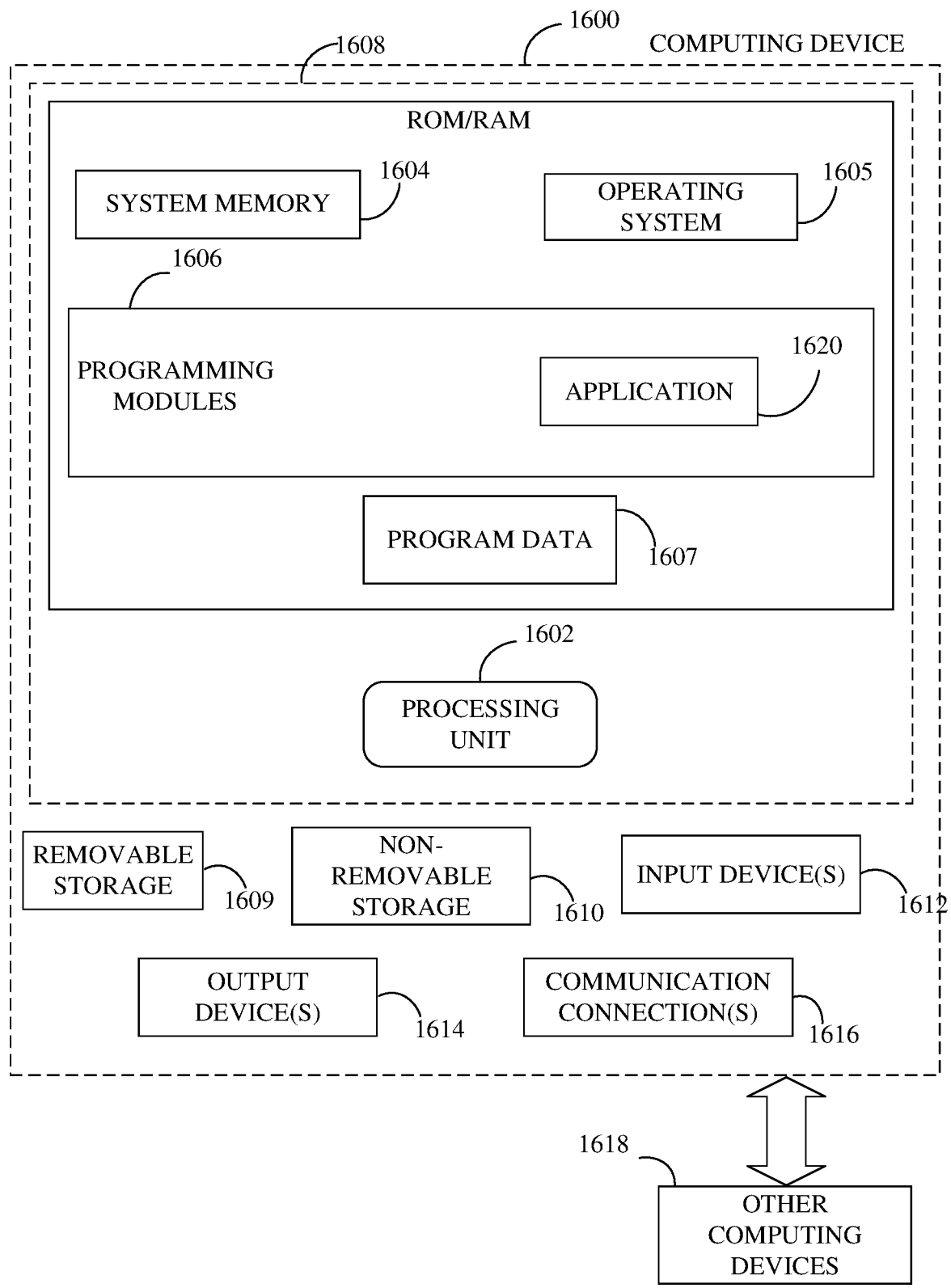
FIG. 16 is a block diagram of a computing device for implementing the methods disclosed herein, in accordance with some embodiments.

With reference to FIG. 16, a system consistent with an embodiment of the disclosure may include a computing device or cloud service, such as computing device 1600. In a basic configuration, computing device 1600 may include at least one processing unit 1602 and a system memory 1604. Depending on the configuration and type of computing device, system memory 1604 may comprise, but is not limited to, volatile (e.g. random-access memory (RAM)), non-volatile (e.g. read-only memory (ROM)), flash memory, or any combination. System memory 1604 may include operating system 1605, one or more programming modules 1606, and may include a program data 1607. Operating system 1605, for example, may be suitable for controlling computing device 1600's operation. In one embodiment, programming modules 1606 may include image-processing module, machine learning module. Furthermore, embodiments of the disclosure may be practiced in conjunction with a graphics library, other operating systems, or any other application program and is not limited to any particular application or system. This basic configuration is illustrated in FIG. 16 by those components within a dashed line 1608.

Computing device 1600 may have additional features or functionality. For example, computing device 1600 may also include additional data storage devices (removable and/or non-removable) such as, for example, magnetic disks, optical disks, or tape. Such additional storage is illustrated in FIG. 16 by a removable storage 1609 and a non-removable storage 1610. Computer storage media may include volatile and non-volatile, removable and non-removable media implemented in any method or technology for storage of information, such as computer-readable instructions, data structures, program modules, or other data. System memory 1604, removable storage 1609, and non-removable storage 1610 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1600. Any such computer storage media may be part of device 1600. Computing device 1600 may also have input device(s) 1612 such as a keyboard, a mouse, a pen, a sound input device, a touch input device, a location sensor, a camera, a biometric sensor, etc. Output device(s) 1614 such as a display, speakers, a printer, etc. may also be included. The aforementioned devices are examples and others may be used.

Computing device 1600 may also contain a communication connection 1616 that may allow device 1600 to communicate with other computing devices 1618, such as over a network in a distributed computing environment, for example, an intranet or the Internet. Communication connection 1616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1604, including operating system 1605. While executing on processing unit 1602, programming modules 1606 (e.g., application 1620) may perform processes including, for example, one or more stages of methods, algorithms, systems, applications, servers, databases as described above. The aforementioned process is an example, and processing unit 1602 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

The following is claimed:

1. A method of ranking agents making sales of real estate, the method comprising:
   receiving, using a communication device, at least one sale pitch delivered by an agent for making a sale of a real estate to a client on a platform in at least one sale session from at least one first device, wherein the at least one first device comprises at least one first capturing device configured for capturing the at least one sale pitch delivered by the agent, wherein the at least one sale session is established between the agent and the client on the platform, wherein the at least one sale pitch comprises at least one of an agent voice, an agent video, and an agent movement of the agent;
   receiving, using the communication device, at least one response provided by the client corresponding to the at least one sale pitch delivered on the platform in the at least one sale session from at least one second device, wherein the at least one second device comprises at least one second capturing device configured for capturing the at least one response of the client, wherein the at least one response comprises at least one of a client voice, a client video, and a client movement of the client, wherein the at least one second capturing device comprises at least one of a second audio capturing device, a second video capturing device, and a second motion capturing device;
   analyzing, using a processing device, at least one of the at least one sale pitch and the at least one response in the at least one sale session using at least one machine learning model, wherein the analyzing of the at least one sale pitch comprises performing at least one of an agent voice analysis of the agent voice, an agent video analysis of the agent video, and an agent movement analysis of the agent movement and performing at least one of a client voice analysis of the client voice, a client video analysis of the client video, and a client movement analysis of the client movement;
   authenticating, using the processing device, the client using at least one authenticating method based on the performing of at least one of the client voice analysis of the client voice, the client video analysis of the client video, and the client movement analysis of the client movement, wherein the at least one authenticating method comprises at least one of e-signature authentication, facial authentication, and voice authentication;
   retrieving, using a storage device, at least one of client data associated with the client, real estate data associated with the real estate, and agent data associated with the agent based on the authenticating;
   performing, using the processing device, at least one transaction process for the sale of the real estate using at least one of the client data associated with the client, the real estate data associated with the real estate, and the agent data associated with the agent based on the authenticating;
   generating, using the processing device, transaction data based on the performing of the at least one transaction process;
   analyzing, using the processing device, the transaction data;
   converting, using the processing device, the agent voice into an agent speech using at least one natural language processing model based on the performing of the agent voice analysis;

analyzing, using the processing device, the agent speech;
identifying, using the processing device, at least one persuasive word in the agent speech based on the analyzing of the agent speech;
generating, using the processing device, an agent score for the agent based on the analyzing of at least one of the at least one sale pitch and the at least one response, the analyzing of the transaction data and the identifying of the at least one persuasive word, wherein the agent score is generated based on a number of points awarded to the agent based on a performance of the agent on at least one parameter, wherein the agents are ranked based on the agent score; and
storing, using the storage device, the agent score and at least one of the at least one sale pitch and the at least one response of the at least one sale session.

2. The method of claim 1, wherein the platform comprises a virtual showcasing platform, wherein the virtual showcasing platform is configured for showcasing a virtual representation of the real estate, wherein the at least one sale pitch comprises at least one agent interaction of the agent with the virtual representation of the real estate showcased on the virtual showcasing platform, wherein the analyzing of the at least one sale pitch comprises performing an interaction analysis of the at least one agent interaction, wherein the generating of the agent score is further based on the performing of the interaction analysis.

3. The method of claim 1 further comprising:
receiving, using the communication device, at least one feedback provided by the client after the at least one sale session from the at least one second device; and
analyzing, using the processing device, the at least one feedback, wherein the generating of the agent score is further based on the analyzing of the at least one feedback.

4. The method of claim 1 further comprising:
generating, using the processing device, at least one session characteristic based on the at least one sale session; and
analyzing, using the processing device, the at least one session characteristic based on the generating of the at least one session characteristic, wherein the generating of the agent score is further based on the analyzing of the at least one session characteristic.

5. The method of claim 1, wherein the at least one first capturing device comprises at least one of a first audio capturing device, a first video capturing device, and a first motion capturing device.

6. The method of claim 1 further comprising determining, using the processing device, at least one tracking parameter in at least one of the agent voice, the agent video, and the agent movement based on the performing of at least one of the agent voice analysis, the agent video analysis, and the agent motion analysis of at least one of the agent voice, the agent video, and the agent movement, wherein the generating of the agent score is further based on the determining of the at least one tracking parameter.

7. The method of claim 1 further comprising determining, using the processing device, a persuasiveness of the at least one sale pitch based on the performing of at least one of the agent voice analysis, the agent video analysis, and the agent motion analysis of at least one of the agent voice, the agent video, and the agent movement, wherein the generating of the agent score is further based on the determining of the persuasiveness.

8. The method of claim 1 further comprising:
determining, using the processing device, at least one agent word in the agent speech based on the analyzing of the agent speech;
determining, using the processing device, at least one client expression of the client based on the performing of at least one of the client voice analysis, the client video analysis, and the client motion analysis of at least one of the client voice, the client video, and the client movement;
matching, using the processing device, the at least one client expression with the at least one agent word based on the determining of the at least one client expression and the determining of the at least one agent word; and
determining, using the processing device, a match between the at least one client expression and the at least one agent word based on the matching, wherein the generating of the agent score is further based on the determining of the match.

9. A system of ranking agents making sales of real estate, the system comprising:
a platform, wherein at least one sale session is established between an agent and a client on the platform;
at least one first device, wherein the at least one first device comprises at least one first capturing device configured for capturing at least one sale pitch delivered by the agent;
at least one second device, wherein the at least one second device comprises at least one second capturing device configured for capturing at least one response of the client, wherein the at least one second capturing device comprises at least one of a second audio capturing device, a second video capturing device, and a second motion capturing device;
a communication device configured for:
receiving the at least one sale pitch delivered by the agent for making a sale of a real estate to a client on the platform in the at least one sale session from the at least one first device, wherein the at least one sale pitch comprises at least one of an agent voice, an agent video, and an agent movement of the agent; and
receiving the at least one response provided by the client corresponding to the at least one sale pitch delivered on the platform in the at least one sale session from the at least one second device, wherein the at least one response comprises at least one of a client voice, a client video, and a client movement of the client;
a processing device communicatively coupled with the communication device, wherein the processing device is configured for:
analyzing at least one of the at least one sale pitch and the at least one response in the at least one sale session using at least one machine learning model: wherein the analyzing of the at least one sale pitch comprises performing at least one of an agent voice analysis of the agent voice, an agent video analysis of the agent video, and an agent movement analysis of the agent movement and performing at least one of a client voice analysis of the client voice, a client video analysis of the client video, and a client movement analysis of the client movement;
authenticating the client using at least one authenticating method based on the performing of at least one of the client voice analysis of the client voice, the client video analysis of the client video, and the client movement analysis of the client movement, wherein the at least one authenticating method comprises at least one of e-signature authentication, facial authentication, and voice authentication;
performing at least one transaction process for the sale of the real estate using at least one of client data associated with the client, real estate data associated with the real estate, and agent data associated with the agent based on the authenticating;
generating transaction data based on the performing of the at least one transaction process;
analyzing the transaction data;
converting the agent voice into an agent speech using at least one natural language processing model based on the performing of the agent voice analysis;
analyzing the agent speech;
identifying at least one persuasive word in the agent speech based on the analyzing of the agent speech; and
generating an agent score for the agent based on the analyzing of at least one of the at least one sale pitch and the at least one response, the analyzing of the transaction data and the identifying of the at least one persuasive word, wherein the agent score is generated based on a number of points awarded to the agent based on a performance of the agent on at least one parameter, wherein the agent score is generated based on a number of points awarded to the agent based on a performance of the agent on at least one parameter, wherein the agents are ranked based on the agent score; and
a storage device communicatively coupled with the processing device, wherein the storage device is configured for:
retrieving at least one of the client data associated with the client, the real estate data associated with the real estate, and the agent data associated with the agent based on the authenticating; and
storing the agent score and at least one of the at least one sale pitch and the at least one response of the at least one sale session.

10. The system of claim 9, wherein the platform comprises a virtual showcasing platform, wherein the virtual showcasing platform is configured for showcasing a virtual representation of the real estate, wherein the at least one sale pitch comprises at least one agent interaction of the agent with the virtual representation of the real estate showcased on the virtual showcasing platform, wherein the analyzing of the at least one sale pitch comprises performing an interaction analysis of the at least one agent interaction, wherein the generating of the agent score is further based on the performing of the interaction analysis.

11. The system of claim 9, wherein the communication device is further configured for receiving at least one feedback provided by the client after the at least one sale session from the at least one second device, wherein the processing device is further configured for analyzing the at least one feedback, wherein the generating of the agent score is further based on the analyzing of the at least one feedback.

12. The system of claim 9, wherein the processing device is further configured for:
generating at least one session characteristic based on the at least one sale session; and
analyzing the at least one session characteristic based on the generating of the at least one session characteristic, wherein the generating of the agent score is further based on the analyzing of the at least one session characteristic.

13. The system of claim 9, wherein the at least one first capturing device comprises at least one of a first audio capturing device, a first video capturing device, and a first motion capturing device.

14. The system of claim 9, wherein the processing device is further configured for determining at least one tracking parameter in at least one of the agent voice, the agent video, and the agent movement based on the performing of at least one of the agent voice analysis, the agent video analysis, and the agent motion analysis of at least one of the agent voice, the agent video, and the agent movement, wherein the generating of the agent score is further based on the identifying of the at least one tracking parameter.

15. The system of claim 9, wherein the processing device is further configured for determining a persuasiveness of the at least one sale pitch based on the performing of at least one of the agent voice analysis, the agent video analysis, and the agent motion analysis of at least one of the agent voice, the agent video, and the agent movement, wherein the generating of the agent score is further based on the determining of the persuasiveness.

16. The system of claim 9, wherein the processing device is further configured for:
determining at least one agent word in the agent speech based on the analyzing of the agent speech;
determining at least one client expression of the client based on the performing of at least one of the client voice analysis, the client video analysis, and the client motion analysis of at least one of the client voice, the client video, and the client movement;
matching the at least one client expression with the at least one agent word based on the determining of the at least one client expression and the determining of the at least one agent word; and
determining a match between the at least one client expression and the at least one agent word based on the matching, wherein the generating of the agent score is further based on the determining of the match.

* * * * *